(12) United States Patent
Aagaard et al.

(10) Patent No.: US 7,193,645 B1
(45) Date of Patent: Mar. 20, 2007

(54) VIDEO SYSTEM AND METHOD OF OPERATING A VIDEO SYSTEM

(75) Inventors: Kenneth John Aagaard, Guttenberg, NJ (US); Larry Barbatsoulis, Long Beach, NY (US); Sean Joseph McManus, New Canaan, CT (US); Craig Matthew Farrell, Little Rock, AR (US)

(73) Assignee: PVI Virtual Media Services, LLC, New York, NY (US)

( * ) Notice: Subject to any disclaimer, the term of this patent is extended or adjusted under 35 U.S.C. 154(b) by 805 days.

(21) Appl. No.: 09/626,568

(22) Filed: Jul. 27, 2000

(51) Int. Cl.
*H04N 5/232* (2006.01)
*H04N 7/18* (2006.01)

(52) U.S. Cl. .................. 348/211.3; 348/157; 348/169

(58) Field of Classification Search ............ 348/211.1, 348/211.3, 211.7, 211.9, 211.11, 143, 144, 348/157, 159, 14.09, 705, 170, 169, 211.4; 386/118
See application file for complete search history.

(56) References Cited

U.S. PATENT DOCUMENTS 3,217,098 A * 11/1965 Oswald ..................... 348/157

(Continued)

FOREIGN PATENT DOCUMENTS

EP 0529317 3/1993

(Continued)

OTHER PUBLICATIONS

Nikon Coolpix 990 User Guide, Apr. 15, 2000; URL address: http://www.cs.mtu.edu/~shene/DigiCam/User-Guide/990/ON-CAMERA-LENS/optical-zoom.html.*

(Continued)

*Primary Examiner*—Lin Ye
(74) *Attorney, Agent, or Firm*—Reed Smith LLP (57) ABSTRACT

A video imaging system includes a master video camera for producing video images of a moving object of interest, a plurality of additional video cameras each positioned at a different location for producing additional video images of the object of interest from different spatial perspectives, and a control system for controlling the additional video cameras to track the object of interest imaged by the master video camera. The system generates video images using a method comprising the steps of producing a master video image of a moving object of interest, producing additional video images of the object of interest from different spatial perspectives, and controlling size of the object of interest in the additional video images in response to the size of the object of interest in the master video image. The invention further encompasses a method of presenting a video image comprising the steps of producing a plurality of video images of an object of interest from a plurality of spatial perspectives, displaying one of said video images for a period of time, selecting a frame in the displayed video image, and switching the displayed video image among a plurality of corresponding frames of said plurality of video images to display the object of interest from multiple spatial perspectives, giving the illusion of a single camera moving around the frozen object(s). This invention further encompasses the recording of point sound source by placing microphones at the cameras such that the microphones receive sound waves from the direction of the field of view of the cameras, and processing audio signals produced by these microphones to produce an audio output signal representative of sound being produced at a particular location in the area occupied by an event being recorded.

15 Claims, 8 Drawing Sheets

U.S. PATENT DOCUMENTS

| | | | |
|---|---|---|---|
| 3,969,588 A | | 7/1976 | Raydon et al. |
| 4,684,990 A | | 8/1987 | Oxley |
| 4,741,038 A | | 4/1988 | Elko et al. |
| 4,905,081 A | | 2/1990 | Morton |
| 5,101,268 A | * | 3/1992 | Ohba .......................... 348/43 |
| 5,164,827 A | * | 11/1992 | Paff .......................... 348/143 |
| 5,363,297 A | | 11/1994 | Larson et al. |
| 5,434,617 A | * | 7/1995 | Bianchi ...................... 348/170 |
| 5,448,291 A | * | 9/1995 | Wickline .................... 348/159 |
| 5,495,576 A | | 2/1996 | Ritchey |
| 5,590,094 A | * | 12/1996 | Inanaga et al. ................ 369/4 |
| 5,598,208 A | * | 1/1997 | McClintock ................ 348/159 |
| 5,617,490 A | | 4/1997 | Kume et al. |
| 5,668,595 A | | 9/1997 | Katayama et al. |
| 5,675,377 A | | 10/1997 | Gibas |
| 5,684,937 A | | 11/1997 | Oxaal |
| 5,699,444 A | | 12/1997 | Palm |
| 5,729,471 A | * | 3/1998 | Jain et al. .................... 725/131 |
| 5,745,126 A | | 4/1998 | Jain et al. |
| 5,831,619 A | | 11/1998 | Nakagawa et al. |
| 5,850,352 A | | 12/1998 | Moezzi et al. |
| 5,892,538 A | | 4/1999 | Gibas |
| 5,912,700 A | * | 6/1999 | Honey et al. ................ 348/157 |
| 5,963,203 A | | 10/1999 | Goldberg et al. |
| 6,002,743 A | | 12/1999 | Telymonde |
| 6,009,188 A | | 12/1999 | Cohen et al. |
| 6,014,163 A | | 1/2000 | Houskeeper |
| 6,038,368 A | | 3/2000 | Boetje et al. |
| 6,069,961 A | | 5/2000 | Nakazawa |
| 6,133,946 A | | 10/2000 | Cavallaro et al. |
| 6,154,250 A | * | 11/2000 | Honey et al. ................ 348/157 |
| 6,160,544 A | * | 12/2000 | Hayashi et al. ............. 345/716 |
| 6,275,258 B1 | | 8/2001 | Chim |
| 6,359,647 B1 | * | 3/2002 | Sengupta et al. ........... 348/154 |
| 6,507,366 B1 | * | 1/2003 | Lee ............................. 348/352 |
| 2002/0005902 A1 | * | 1/2002 | Yuen .......................... 348/211 |
| 2002/0118286 A1 | | 8/2002 | Kanade et al. |

FOREIGN PATENT DOCUMENTS

| | | |
|---|---|---|
| EP | 0714081 | 5/1996 |
| WO | WO 98 47291 | 10/1998 |
| WO | WO 00 08856 | 2/2000 |
| WO | WO 01/08417 | 2/2001 |

OTHER PUBLICATIONS

Glossary: Optical: Focal Length, 1998-2006, URL address: http://www.dpreview.com/learn/?/key=focal+length.*

Rander, "A Multi-Camera Method for 3D Digitization of Dynamic, Real-World Events," *Submitted in partial fulfillment of the requirements for the degree of Doctor of Philosophy in Electrical and Computer Engineering*, May 1998.

Martzke, "CBS gives instant replay at 21$^{st}$ century look," *USA Today*, Jan. 23, 2001, p. 3C.

* cited by examiner

VIDEO SYSTEM AND METHOD OF OPERATING A VIDEO SYSTEM

BACKGROUND OF THE INVENTION

This invention relates to video systems and methods of operating such systems, and more particularly, to video systems employing multiple cameras to produce images of a moving object of interest from different spatial perspectives.

In the televised broadcast of live events, it is frequently desirable to replay portions of the events for further analysis and/or viewer enjoyment. The familiar instant replay feature used in televised sporting events has been used to review sports plays. By replaying video taken by cameras at different locations, it is occasionally possible to obtain a better view of the event than was provided by the original broadcast.

Multiple camera imaging has been the subject of several issued patents. For example, U.S. Pat. No. 5,729,471 and 5,745,126 disclose a multiple camera television system in which an object of interest can be viewed from multiple spatial perspectives using cameras that provide different views of a scene.

However, such multiple camera television systems have typically utilized fixed position cameras. In the telecast of live events, objects of interest in the scene move and it is desirable to be able to move the camera to follow movements of particular objects. When replaying video clips of events such as sporting events it is further desirable to be able to view the events from multiple spatial perspectives. The present invention provides a camera system and method of operation of the camera system that uses multiple cameras to produce video images from multiple spatial perspectives, and permits the replay of those images to view an event from the different spatial perspectives.

SUMMARY OF THE INVENTION

A video imaging system constructed in accordance with this invention includes a master video camera for producing video images of a moving object of interest, a plurality of additional video cameras each positioned at a different location for producing additional video images of the object of interest from different spatial perspectives, and a control system for controlling the additional video cameras to track the object of interest imaged by the master video camera.

The system generates video images using a method comprising the steps of producing a master video image of a moving object of interest, producing additional video images of the object of interest from different spatial perspectives, and controlling size of the object of interest in the additional video images in response to the size of the object of interest in the master video image.

The invention further encompasses a method of presenting a video image comprising the steps of producing a plurality of video images of an object of interest from a plurality of spatial perspectives, displaying one of said video images for a period of time, selecting a frame in the displayed video image, and switching the displayed video image among a plurality of corresponding frames of said plurality of video images to display the object of interest from multiple spatial perspectives, giving the illusion of a single camera moving around the frozen object(s).

This invention also encompasses the recording of point source sound by placing microphones at the camera locations such that the microphones receive sound waves originating within of the field of view of the cameras, and processing audio signals produced by the microphones to produce an audio output signal representative of sound being produced at a particular location in the area occupied by an event being recorded.

DESCRIPTION OF THE PREFERRED EMBODIMENTS

Figure 1:
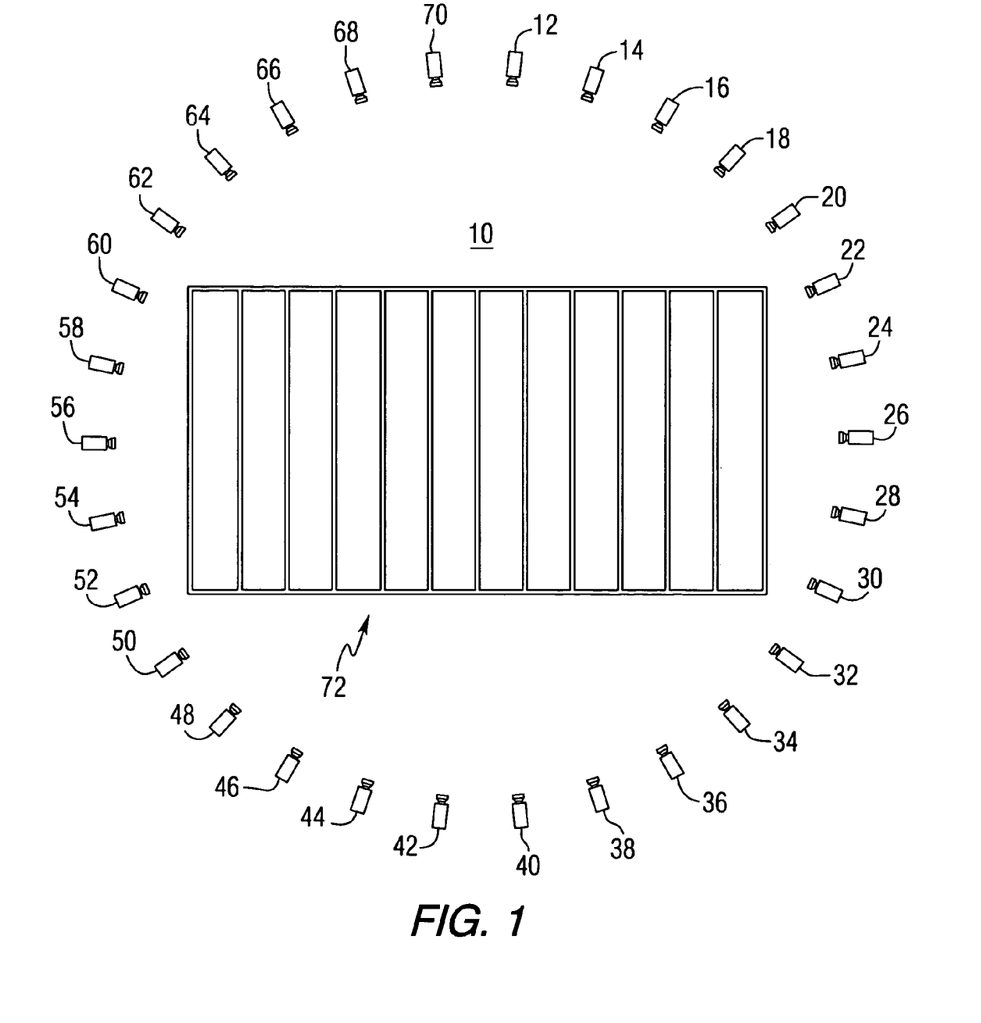
FIG. 1 is a schematic representation of a camera system constructed in accordance with the present invention.

This invention uses a master/slave camera system to record and playback images produced by cameras positioned to provide different spatial perspectives of a scene. While the following description refers generally to video cameras, it should be understood that such cameras could be standard resolution cameras, high definition video cameras, and other devices capable of producing video image signals. Referring to the drawings, FIG. 1 is a schematic representation of a camera system 10 constructed in accordance with the present invention as it can be applied to a television broadcast of an American football game. The system includes a plurality of television cameras 12, 14, 16, 18, 20, 22, 24, 26, 28, 30, 32, 34, 36, 38, 40, 42, 44, 46, 48, 50, 52, 54, 56, 58, 60, 62, 64, 66, 68 and 70 positioned at different locations around the field of play 72. While this example shows the use of thirty cameras, it should understood the invention is not limited to a particular number of cameras, and a greater or smaller number of cameras can be used within the scope of the invention. The cameras are located at spaced positions to provide video images of various objects of interest in the field of play from various spatial perspectives.

Figure 2:
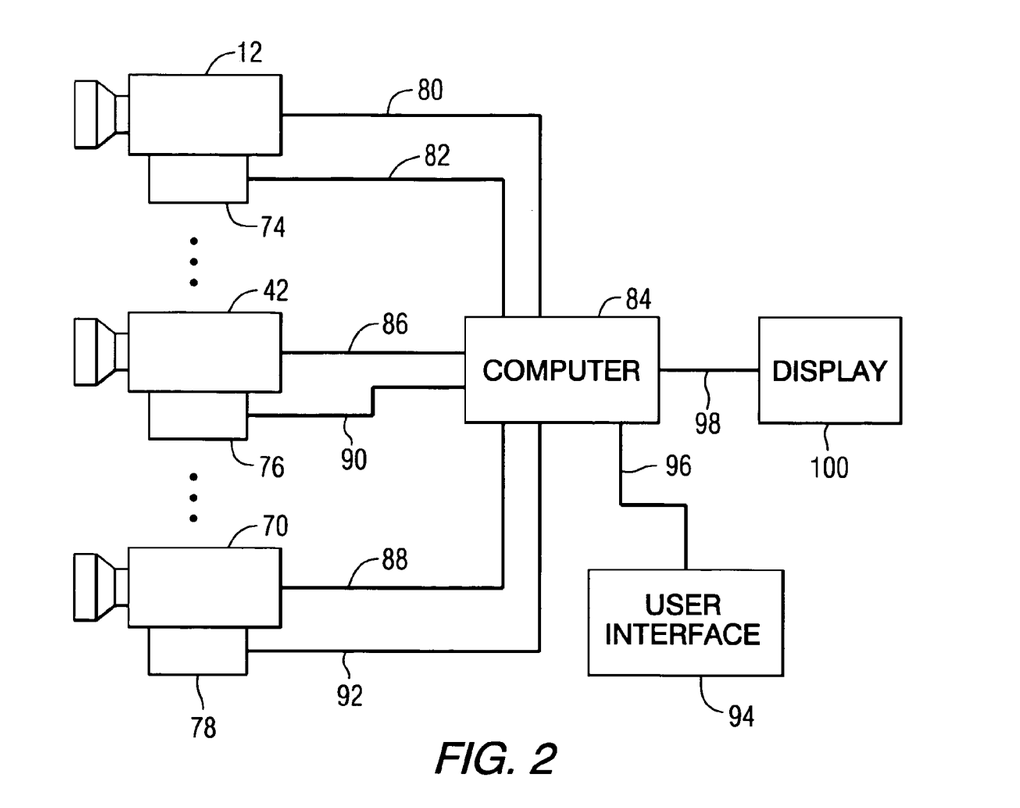
FIG. 2 is block diagram of the camera system of FIG. 1 showing additional components not shown in FIG. 1.

FIG. 2 is block diagram of the camera system of FIG. 1 showing additional components not shown in FIG. 1. While only three cameras are shown in FIG. 2, it will be understood that all of the cameras would be connected to the computer 84 in a manner similar to that shown in FIG. 2. In FIG. 2, camera 12 is shown as the master camera, and is coupled to a camera monitoring unit 74 that monitors the various parameters of the master camera that will be needed to coordinate the operation of the additional cameras 14–70. The illustrated additional cameras 42, 70 are shown to be coupled to camera positioning and monitoring units 76 and 78. The positioning and monitoring units 76 and 78 receive control signals from the computer and control the position, focus and framing of the additional cameras in response to the control signals. The positioning and monitoring units 76 and 78 also send signals to the computer that are representative of the operational status of the additional cameras. Master camera 12 and its associated monitoring unit 74 are connected, either by wires 80 and 82, or other suitable signal carrying media such as fiber optics or radio links, to a computer 84, or other signal processing device for performing the system control, processing and storage functions. Similarly cameras 42 and 70, and their associated positioning and monitoring units 76 and 78 are connected, either by wires 86, 88, 90 and 92, or other suitable signal carrying media such as fiber optics or radio links, to the computer 84, so that operation of the cameras can be coordinated and video signals from the cameras can be recorded for future viewing and/or additional processing. Audio information collected by microphones at the camera locations can also be transmitted to the computer or another signal processing device by the same signal carrying media or by separate signal carrying media.

To operate the system, the master camera is used to follow an object of interest in the event. For example, the object of interest might be a football or a particular player. As the master camera follows the object of interest, information signals representative of the camera's movements, focus and framing, are sent from the monitoring unit 74 to the computer 84. The computer processes this information and provides control signals to the other cameras thereby directing the other cameras to follow the object of interest. A user interface 94 is connected to the computer by wire 96 or another suitable control channel and used to direct the computer to provide a video output on line 98 for display 100, and/or for further processing or transmission.

Figure 3:
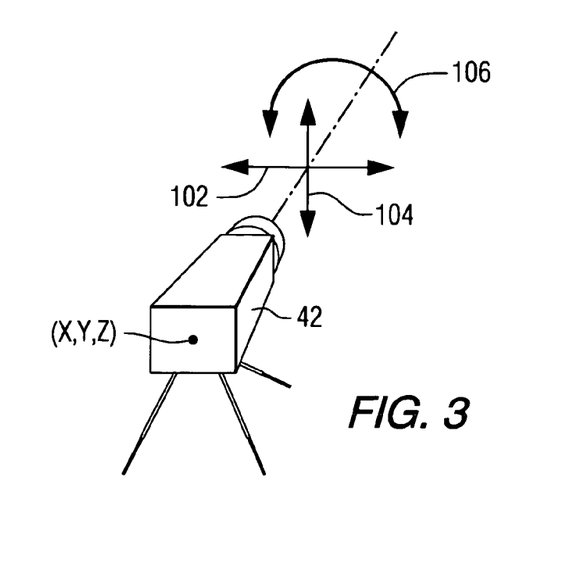
FIG. 3 is schematic representation of a camera that can be used in the system of FIG. 1.

In order to achieve coordinated operation of all of the cameras, the control system must be provided with information about each camera, such as its location with respect to the master camera, vertical and horizontal orientation, field of view, focus distance, etc. FIG. 3 is a schematic representation of one of the additional cameras 42 in a system constructed in accordance with the invention. FIG. 3 shows the various parameters that must be known, such as the location of the camera shown as coordinates x, y and z, and parameters that can be controlled by the associated camera positioning and monitoring device, such as the pan direction 102, the tilt direction 104, and the rotational angle 106. The pan, tilt and rotational angles of the individual cameras can be controlled by mounting the cameras on a robotic platform with the position of the platform being controlled automatically by various known arrangements of servo motors and mechanical couplings. The focus and zoom functions can also be controlled remotely in accordance with known remote control technology, such as the Pro/Four Video Products 2000RP remote positioner.

The location of the cameras with respect to each other (or with respect to the scene to be imaged) would be determined using known techniques, such as by using a global positioning system or using triangulation to determine the location of the cameras with respect to predetermined landmarks in the scene, such as the corners of a football field. Once the locations of all of the cameras are known, this information can be combined with information retrieved from the master camera, such as the distance from the master camera to an object of interest in the scene, to determine the movement, zoom and focus parameters for the additional cameras. This information will be supplied by the computer to the individual additional camera monitoring and control units to focus the additional cameras and to adjust the framing so that the object of interest is substantially the same size in each of the video images produced by the cameras.

In the preferred embodiment, the master camera is manually controlled to focus on, and follow an object of interest. The object of interest should be positioned within a portion of the camera's field of view, referred to as the "sweet spot". The sweet spot is a portion of the camera's field of view that contains the object of interest. The sweet spot would typically be near the center of a camera's field of view, but through the use of appropriate signal processing, other parts of the field of view could be used. The framing of an object at the sweet spot would change in relation to the action being shot. For example, at the beginning of a football play, the shot might be wider to include most of the players, but as the focus is narrowed to one or two players, so would the framing of the master camera, and thus the slave cameras.

As the master camera tracks the object of interest, the other cameras are automatically controlled to track the object of interest in a manner that permits subsequent viewing of the various images recorded by the cameras. That is, the automatically controlled additional cameras should focus on the object of interest and adjust the field of view so that the object of interest is substantially the same size in the images recorded by the various cameras.

In the preferred embodiment, using data from the master camera, the invention will calculate the position of the object of interest, for example using an X-Y-Z coordinate system, where X and Y are perpendicular axes in a horizontal plane upon which the event being observed occurs. The Z direction is normal to the horizontal plane. Then all of the additional cameras will move in unison to track the object that is being tracked by the master camera. The zoom and focus of the additional cameras will be controlled so that the object of interest in each of the video images will be substantially the same size. During the tracking, video images produced by each camera will be stored in the computer or a similar storage device. In the preferred embodiment, the images would be stored in a digital disc recorder, such as the Pinnacle Thunder or Tektronics Profile.

Figure 4:
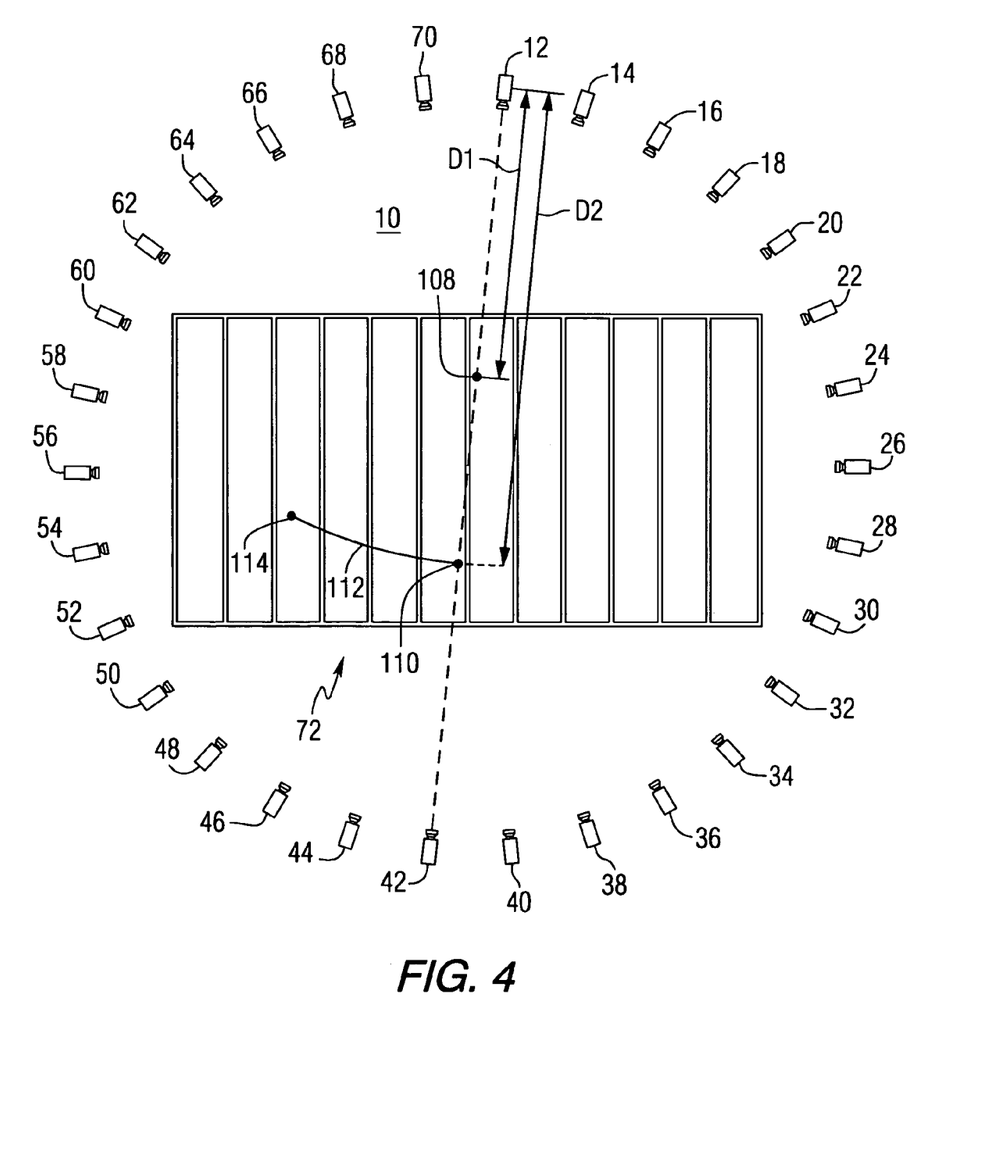
FIG. 4 is a schematic representation of the camera system of FIG. 1 with various locations of objects of interest identified in the area of interest.

The operation of the invention can be further described by referring to FIG. 4. In FIG. 4, assume that camera 12 is the master camera and is initially focused on an object of interest, such as a football player at location 108. By using known locations of the additional cameras, the distance D1 from camera 12 to location 108 and the framing size (or zoom) information for camera 12, the computer can calculate the information needed to direct all of the additional cameras to focus on the object of interest and to adjust the frame size so that the object of interest appears to be substantially the same size in the video images produced by each of the cameras. This calculated information is then sent to the camera positioning units associated with each of the additional cameras, and the positioning units move the cameras to the correct position.

If the object of interest moves to location 110, the tilt angle of the master camera will change to following the object. If the field of view is not changed at the master camera, the object of interest will appear smaller due the increased distance D2 between the master camera and the object of interest. Camera 42, which is located directly across the field from the master camera will be directed to change its tilt angle to follow the object of interest and will also have to increase its field of view (zoom out) so that the object of interest is substantially the same size in the image produced by camera 42 as it is in the image produced by the master camera. All of the other cameras will be directed to change their tilt angle, pan angle and zoom to image the object of interest from their respective spatial perspectives and to ensure that the object of interest is substantially the same size in their respective images as in the image produced by the master camera.

If the object of interest subsequently moves along line 112 toward point 114, the distance between the object of interest and camera 12 does not change, and assuming the that the framing size remains constant, the size of the object in the image produced by camera 12 will remain the same. However, since the distance between the object of interest and all of the other cameras has changed, all of the other cameras will have to adjust their zoom to keep the size of the object of interest in their images substantially the same as in the image produced by the master camera.

An example of the method used to locate an object of interest and control the slave cameras will now be described with respect to the use of the invention in the broadcast of a sporting event. First a Cartesian coordinate system will be defined in which the field of play lies in an X,Y plane, with the Z direction being perpendicular to the plane. The master camera will be manually controlled to focus on an object of interest, also referred to as a target. The target location on the field will be derived from the master camera's pointing characteristics. Pan, tilt and zoom information from the master camera will be monitored, in the preferred embodiment using optical encoders, and fed back to the computer system. The computer system will then calculate the location of the target in X,Y space. A Z coordinate can be assigned to the focal plane of field to provide the desired framing. For example, a Z coordinate of 4 feet above ground level would be appropriate for systems covering a football game.

Figure 5:
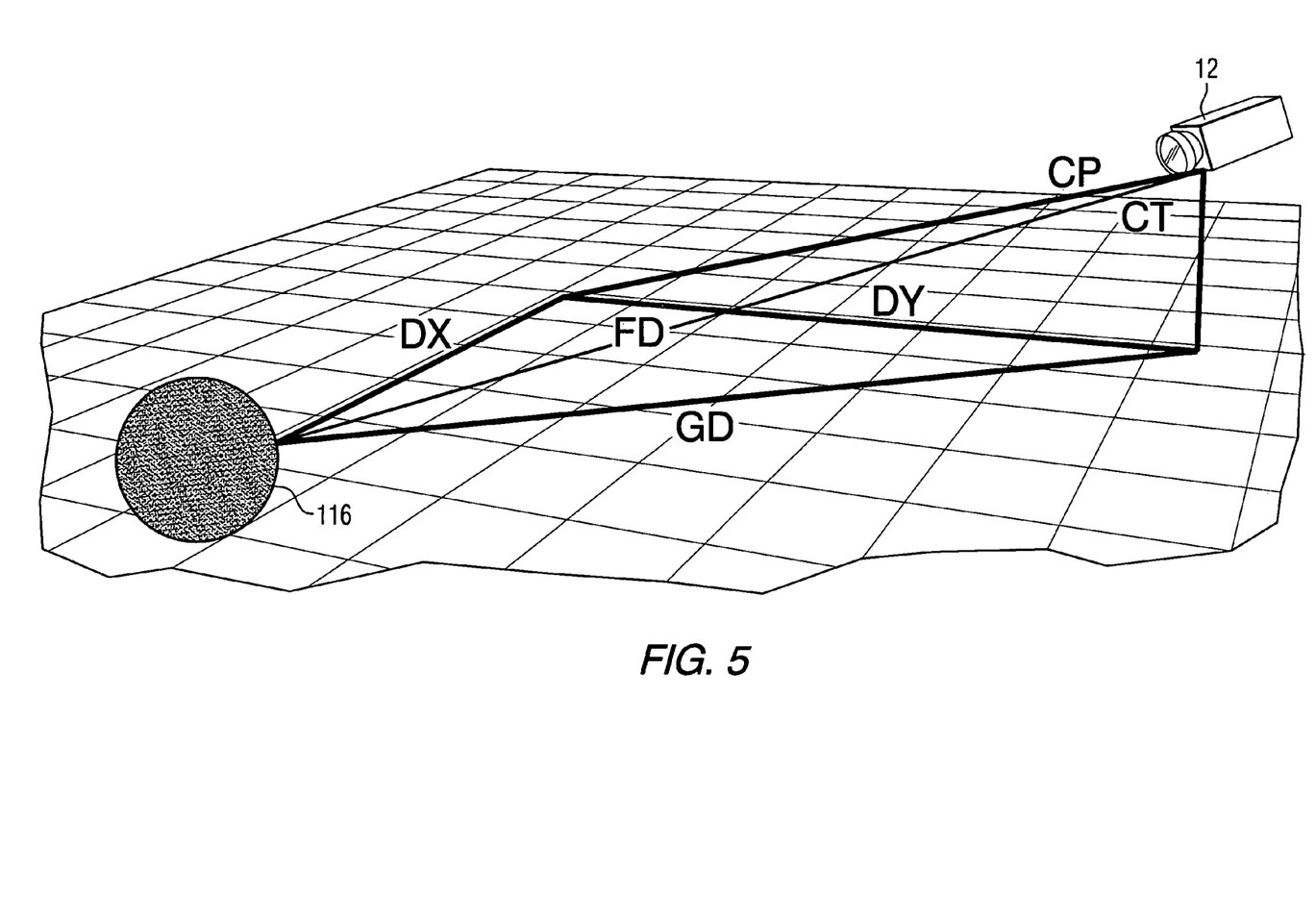
FIG. 5 is a schematic representation showing the various parameters that are measured or calculated when practicing the method of the present invention.

FIG. 5 is a schematic representation of the relationships between a camera 12 and the target 116. First the target's location with respect to the master camera can be determined. The master camera tilt angle (CT) can be used to calculate the line of sight distance, or focal distance (FD), and ground distance (GD) from the master camera, using the following formulas where Z is the height of the master camera above the X,Y plane. $Z/TAN(90-CT)=GD$ $$Z^2+GD^2=\sqrt{FD}$$

Once the focal distance and ground distance are known, the camera pan information (CP) can be used to calculate the X and Y coordinates of the target. This is determined by finding the difference in the X position between the master camera location and the target location (DX) and the difference in the Y position between the master camera location and the target location (DY) using the following equations.

$$GD*SIN(CP)=DX$$

$$GD*COS(CP)=DY$$

Then the camera's position in the world (CX,CY) can be added to (DX,DY) to obtain the real world target coordinates of (TX,TY).

Zoom information for the master camera can be arrived at in two ways. Either by the computer telling the camera zoom what field of view is wanted or the computer getting the information from the camera zoom. In this example we will have the computer control zoom based on field of view (FV). The focal angle (FA) of the lens can be found using the formula:

$$90-A\ TAN\ 2(FV/2,FD)=FA$$

The above steps provide all of the information needed from the master camera. This information can now be used to control the "slave" cameras. First, the robotic slave camera positioning system must be told where to point. The position of the slave camera in the world coordinates is (CX,CY,Z).

The difference between the slave camera position and the target position (DX, DY) in the X,Y plane can be determined using the following formulas:

$$TX-CX=DX$$

$$TY-CY=DY$$

The difference in positions in the Z direction is found by subtracting the Z coordinate of the target from the Z coordinate of the camera. Then the ground distance (GD) between the slave camera and the target can be found using the formula:

$$\sqrt{(DX^2+DY^2)}=GD$$

The Camera Tilt (CT) angle can be found using the formula:

$$90-A\ TAN\ 2(GD,Z)=CT$$

The Camera Pan (CP) angle can be found using the formula:

$$90-A\ TAN\ 2(DX,DY)=CP$$

The Camera Focal Distance (FD) can be found using the formula:

$$\sqrt{(GD^2+Z^2)}=FD$$

The Focal Angle (FA) can be found using the formula:

$$90-A\ TAN\ 2(FV/2,GD)=FA$$

The CT, CP, FD, and FA are then sent to the slave camera robotic positioning system, which will cause the slave camera to track the target and match the framing of the master camera.

This invention is particularly suitable for providing improved video replay images. The video images of an event of interest from a plurality of the cameras will be stored in a suitable storage medium, such as a digital data file or videotape system. To produce a replay of an event, one of the video images will be played until a particular video frame of the event of interest is depicted in the video. At that time, the video will be frozen to display the particular video frame. The display will then switch among frames in the video images that were produced by the other cameras. The frames of the video images that were produced by the other cameras may be frames that correspond in time to the originally selected frame, or they may be other frames, such as those recorded at successive instants of time. Since the video images have been recorded from different spatial locations, that in the preferred embodiment encompass views surrounding the scene, this will effectively rotate the object being displayed. The cut between video sources can be done in a number of well-known ways, for example using a routing switcher such as the Grass Valley SMS 7000 or the Pesa Jaguar. Once a desired degree of rotation has been achieved, the video images from the camera positioned at the location viewing the desired angle of view can be played to continue full motion video.

As an alternative to rotation of a frozen image, for some applications, such as where the a single object of interest, or a small number of objects are located near the sweet spot, moving video can be displayed by switching among the video images from the various cameras.

Figure 6A:
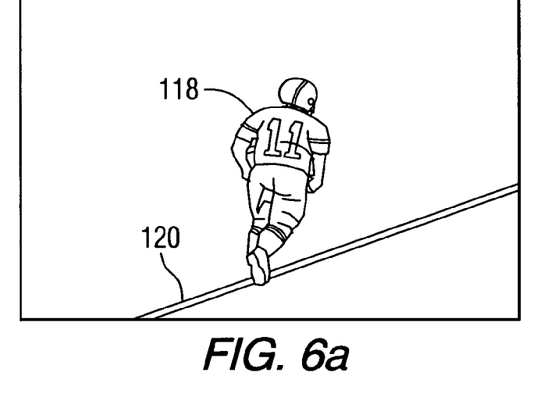
FIGS. 6*a*, 6*b*, 6*c*, 6*d* and 6*e* are frames of video images that illustrate the operation of the present invention.
Figure 6B:
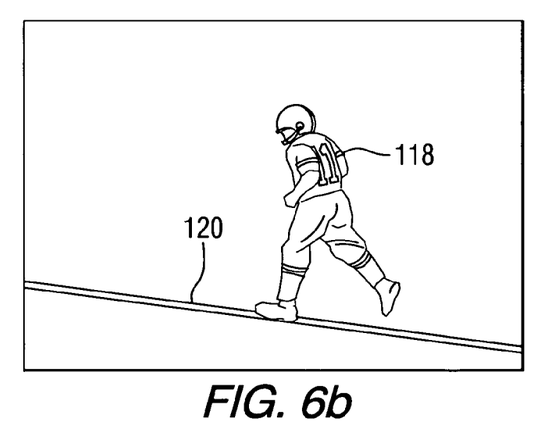
Figure 6C:
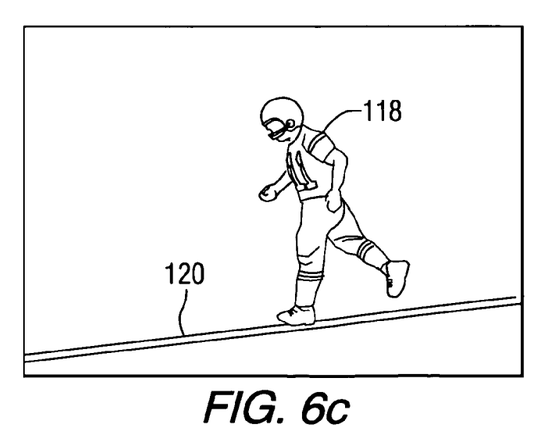
Figure 6D:
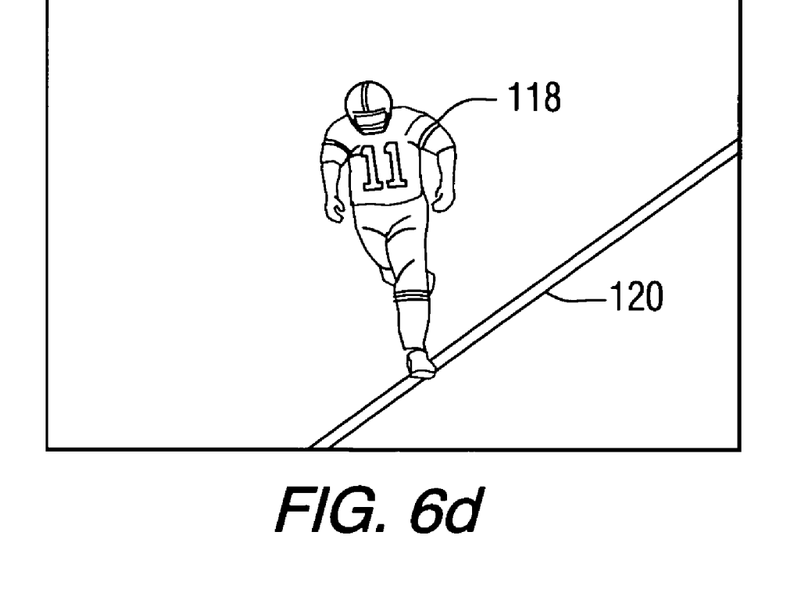
Figure 6E:
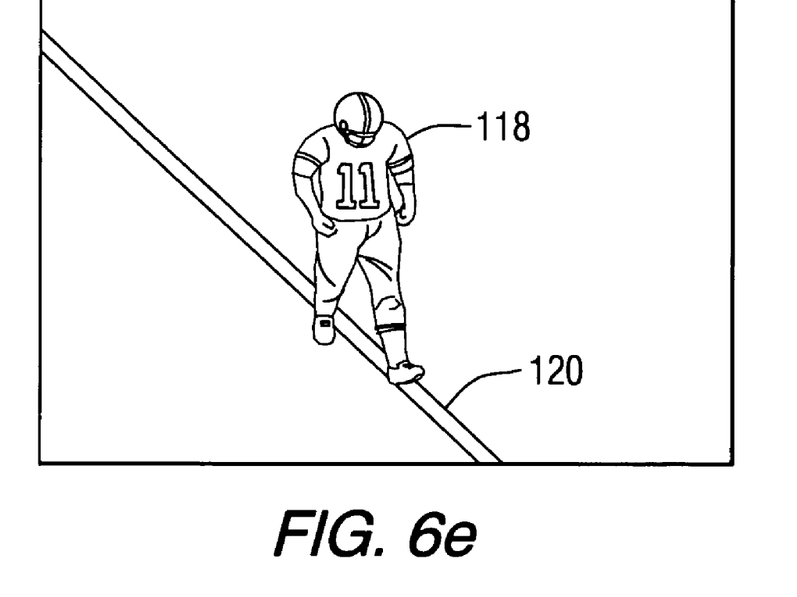

FIGS. 6a, 6b, 6c, 6d and 6e are simulated frames of video images that illustrate the operation of the present invention in a video replay mode. Assume that video images produced by camera 26 in FIG. 1 are displayed on a monitor. The viewer wishes to see if player 118 has stepped on sideline 120. As the player approaches the sideline, a particular frame of the video produced by camera 26 is selected and shown in FIG. 6a. In the frame of FIG. 6a, the viewer cannot see if the player's left foot has hit sideline 120. To achieve a better view, the corresponding frame produced by camera 34 is shown in FIG. 6b. In this frame it is apparent that the player's foot has touched the line 120. FIGS. 6c, 6d and 6e shows the corresponding frame from the video recorded by cameras 42, 48 and 56 respectively. It should be apparent that by switching among corresponding frames of images recorded by the various cameras, the image of the player is effectively rotated on the display. Once a particular frame has been selected from the available frames, the full motion video can be resumed by running the video recorded from the camera that recorded the selected frame.

Figure 7A:
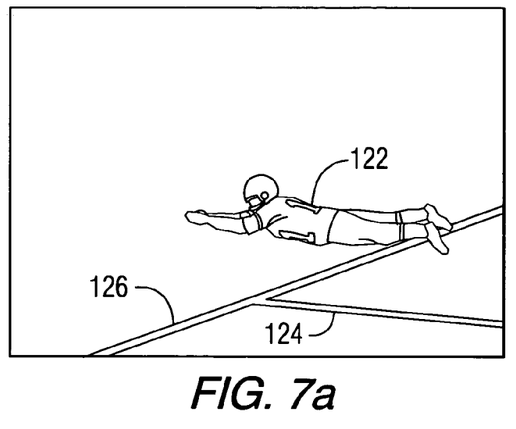
FIGS. 7*a*, 7*b*, 7*c*, 7*d* and 7*e* are additional frames of video images that illustrate the operation of the present invention.
Figure 7B:
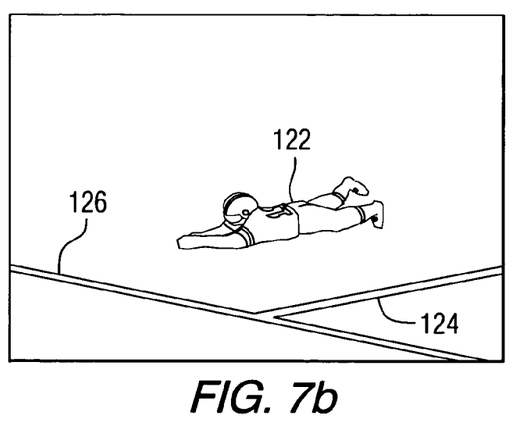
Figure 7C:
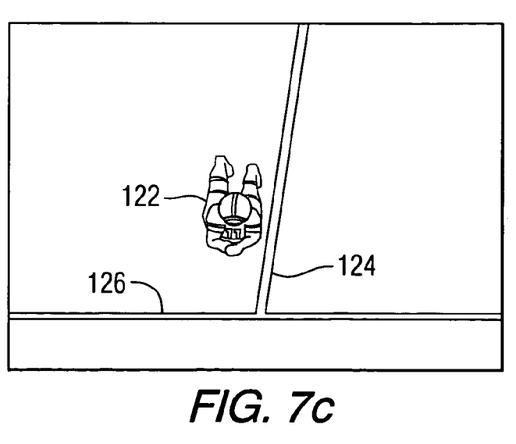
Figure 7D:
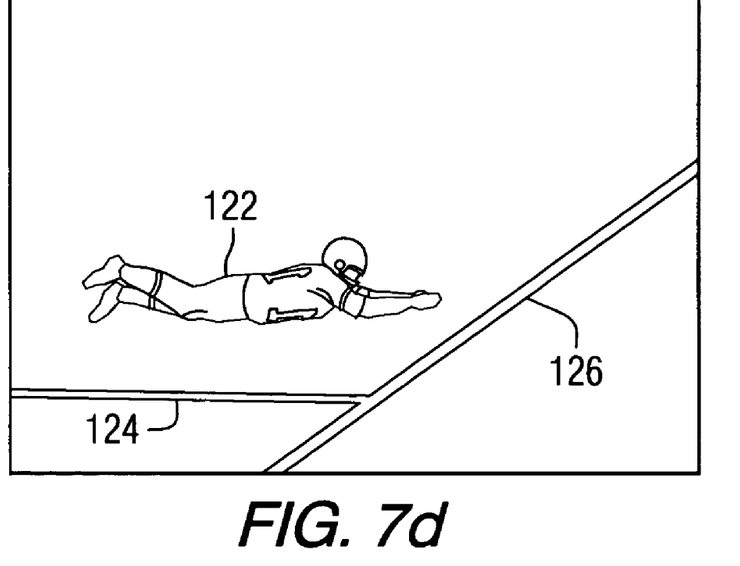
Figure 7E:
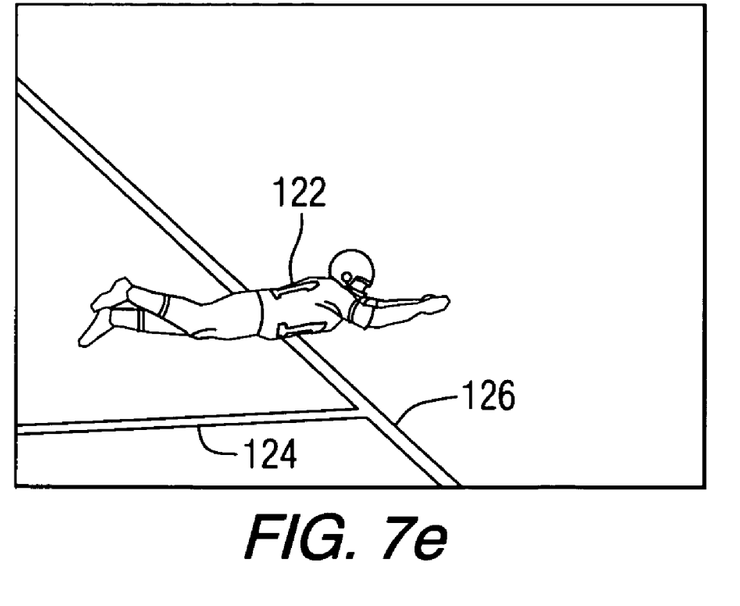

FIGS. 7a, 7b, 7c, 7d and 7e are simulated frames of video images that further illustrate the operation of the present invention. In these frames, the viewer desires to determine if the player 122 has crossed line 124 at the time that he crossed the sideline 126. FIG. 7a is a frame from the image recorded by camera 26. From the spatial perspective of camera 26, the viewer cannot tell if the player has crossed line 124. FIG. 7b is a frame recorded from camera 32. Here again, the viewer cannot tell if the player has crossed line 124. By switching to the frame recorded by camera 36, as shown in FIG. 7c, the viewer can clearly see that the play is to the left of line 124. FIGS. 7d and 7e show corresponding frames recorded from cameras 48 and 58, respectively. FIGS. 7a, 7b, 7c, 7d and 7e again illustrate how the invention uses a frozen image to effectively rotate the image on the display to provide information that might not be obtained from a fixed camera position.

With additional signal processing, synthesized video images can be created by interpolating information in images taken by different cameras to produce views from spatial perspectives where cameras do not actually exist. Such synthesis can result in smoother transitions between images when the object of interest is rotated in the display. For example, interpolation software available from Realviz Corporation could be used to perform the necessary image interpolation.

This invention can be used as part of a live broadcast or as a replay device, giving a 360° view of an object or objects. To use the invention in connection with a sporting event, cameras can be installed either at field level or at some point above the field level such as the mezzanine level of a stadium. The video images provided by the camera system of this invention are similar to a virtual camera that can revolve around and object, as the object remains frozen. The image produced by the master camera can be framed wide or tight, and the images produced by the additional cameras will automatically track the image produced by the master camera.

This invention further encompasses the detection, recording and playback of point specific audio. By placing microphones at some or all of the camera locations such that the microphones receive sound from the direction of the field of view of the cameras, audio signals can be produced and fed to the computer for processing. Since the computer will have information concerning the position of the microphones, the audio signals produced by these microphones can be processed to produce an audio output signal representative of sound being produced at a particular location in the area occupied by the event being recorded. For example, since the distance from the camera to the object of interest can be calculated as shown above, if a microphone is mounted at the camera location, the time required for sound produced in the vicinity of the object of interest to reach the microphone location can be calculated. Since the microphones are located at various distances with respect to the object of interest, the sound produced in the vicinity of the object of interest will reach the microphones at different times. By adding a time delay to the signals produced by the microphones to account for the differences in distance from the microphones to the vicinity of the object of interest, and subsequently combining the signals (for example by adding the signals), the sound produced in the vicinity of the object of interest can be recovered. This will produce an audio signal having a higher signal to noise ration than an audio signal produced by any of the individual microphones. The microphones can be connected to the computer or another signal processing device using an arrangement similar to that shown in FIG. 2.

With this invention, a director of a televised sporting event can produce replays of the events that permit an in-depth analysis of the action by combining information contained in video images taken from different spatial perspectives. The invention also provides the ability to change video framing during recording of an event.

In addition to use in broadcasts of football games as shown in the preferred embodiment, this invention has many practical applications, such as, golf swing analysis, and telecasts of basketball, gymnastics, track and field, boxing and entertainment events. Another example is the use of this invention in the movie industry. By using high definition video cameras in place of traditional film cameras to record a scene from a multiple of perspectives, a more complete record of the scene can be obtained, providing for more options in editing of the video for incorporation into a final video sequence. This could reduce the number of times that a scene would have to be recorded to obtain a desired video sequence.

While the present invention has been described in terms of what is at present believed to be its preferred embodiment, it will be apparent to those skilled in the art that numerous changes may be made to the preferred embodiment without departing from the scope of the invention as defined by the following claims.

What is claimed is:

1. A video imaging system, the system comprising:
   a master video camera for producing video images of a moving object of interest;
   a plurality of additional video cameras each positioned at a different location surrounding the object of interest for producing additional video images of the object of interest from different spatial perspectives;
   a control system for controlling said additional video cameras in response to the master video camera to follow movement of the object of interest, wherein said control system includes a means for controlling the focal length of each additional camera such that the size of the moving object of interest is generally equal in each of the master and additional cameras;
   a recording system for recording the video images produced by the master camera and the additional cameras; and
   a user interface for selecting particular ones of the video images for display, wherein said user interface includes a single control device which is adapted to select successive video images from a plurality of additional cameras, each successive one of said plurality of additional cameras being adjacent to a preceding camera, in order to effectuate a partial rotation around the object of interest in the display by moving through said plurality of adjacent additional camera images, such that the size of the object of interest remains generally equal throughout the rotation through successive adjacent additional camera images.

2. The video imaging system of claim 1, further comprising:
a monitoring unit for transmitting signals representative of an operating status of the master camera to the control system; and
a plurality of positioning units for positioning the additional cameras in response to control signals from the control system.

3. The video imaging system of claim 1, wherein the user interface permits the sequential selection of individual frames in the video images.

4. The video imaging system of claim 1, wherein the control system comprises:
a pan control, a tilt control, a focus control and a frame control for each of the additional video cameras; and
a computer processor for coordinating operation of the pan control, the tilt control, the focus control and the frame control for each additional video camera in response position and focus parameters of the master video camera.

5. The video imaging system of claim 1, further comprising:
a plurality of microphones positioned at the locations of predetermined ones of the additional cameras; and
the microphones being coupled to the control system to supply signals representative of audio signals received by the microphones.

6. The system of claim 1, wherein said successive additional camera images displayed during said rotation were all captured at the same time.

7. The system of claim 1, wherein said successive additional camera images displayed during said rotation were captured sequentially in time.

8. The system of claim 5, wherein said control system assigns a delay to each of said sounds signals to account for the relative distance between each microphone and the object of interest.

9. A method of generating a video image, said method comprising the steps of:
producing a master video image of a moving object of interest;
producing additional video images of the object of interest from different spatial perspectives; and
controlling characteristics of said additional video images in response to the master video image to track the object of interest wherein the object of interest is maintained at a generally equivalent size in each of said additional video images by controlling a focal depth of a camera associated with each said additional video images, further wherein a user interface is used to select between the master video image and a plurality of successive adjacent additional user images in order to effectuate a partial rotation around the object of interest by moving through the images from the plurality of successive adjacent additional user images.

10. The method of claim 9, further comprising the steps of:
storing the master video images and the additional video images; and
selecting particular ones of the video images for display.

11. The method of claim 9, wherein the step of selecting particular ones of the video images for display comprises the step of:
sequentially selecting individual frames in the video images.

12. The method of claim 9, further comprising the steps of:
producing signals representative of audio signals received at selected ones of the different spatial perspectives.

13. A method of generating a television image, said method comprising the steps of:
producing a plurality of video images of an object of interest from a plurality of spatial perspectives;
displaying one of said video images for a period of time:
selecting a frame in the displayed video image; and
switching the displayed video image among a plurality of corresponding frames of said plurality of video images to display the object of interest from multiple spatial perspectives, wherein the object of interest is maintained at a generally equivalent size in each of said plurality of video images by controlling a focal depth of a camera associated with each of said plurality of video images, further wherein a user interface is used to select between a master video image and a plurality of successive adjacent additional user images in order to effectuate a partial rotation around the object of interest by moving through the images from the plurality of successive adjacent additional user images.

14. The method of claim 13, further comprising the steps of:
displaying another one of the plurality of video images.

15. A method of generating a television image, said method comprising the steps of:
producing a plurality of video images of an object of interest from a plurality of spatial perspectives;
displaying one of said video images for a period of time; and
switching the displayed video image among said plurality of video images to display the object of interest from multiple spatial perspectives, wherein the object of interest is maintained at a generally equivalent size in each of said plurality of video images by controlling a focal depth of a camera associated with each of said plurality of video images, further wherein a user interface is used to select between a master video image and a plurality of successive adjacent additional user images in order to effectuate a partial rotation around the object of interest by moving through the images from the plurality of successive adjacent additional user images.

* * * * *